United States Patent
Han (10) Patent No.: US 8,250,193 B2
(45) Date of Patent: Aug. 21, 2012

(54) METHOD AND APPARATUS FOR PROVIDING REMOTE DEVICE WITH SERVICE OF UNIVERSAL PLUG AND PLAY NETWORK

(75) Inventor: Se-hee Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 870 days.

(21) Appl. No.: 12/028,852

(22) Filed: Feb. 11, 2008

(65) Prior Publication Data

US 2008/0301216 A1    Dec. 4, 2008

(30) Foreign Application Priority Data

May 30, 2007 (KR) .................. 10-2007-0052924

(51) Int. Cl.
 *G06F 15/16* (2006.01)
 *G06F 15/173* (2006.01)
(52) U.S. Cl. ....................... 709/223; 709/208
(58) Field of Classification Search .......... 709/217–219, 709/230–237
See application file for complete search history.

(56) References Cited

U.S. PATENT DOCUMENTS

| 7,085,814 B1* | 8/2006 | Gandhi et al. ............... 709/208 |
| 7,149,678 B2* | 12/2006 | Gurevich et al. ............... 703/22 |
| 2005/0262568 A1 | 11/2005 | Hansen et al. |
| 2006/0075100 A1 | 4/2006 | Stirbu |
| 2006/0137005 A1 | 6/2006 | Park |
| 2009/0113557 A1 | 4/2009 | Bodlaender et al. |

FOREIGN PATENT DOCUMENTS

| KR | 1020060068211 A | 6/2006 |
| KR | 10-2006-0129259 A | 12/2006 |
| KR | 1020060133972 A | 12/2006 |
| KR | 1020070009741 A | 1/2007 |

OTHER PUBLICATIONS

"UPnP Forum, UPnP Devive Architechture 1.0", Jul. 20, 2006, p. 10-59.
Communication issued Oct. 31, 2011, in Korean Patent Application No. 10-2007-0052924.

* cited by examiner

*Primary Examiner* — Ian N Moore
*Assistant Examiner* — Afshawn Towfighi
(74) *Attorney, Agent, or Firm* — Sughrue Mion, PLLC (57) ABSTRACT

A universal plug and play remote access architecture is provided. A remote access server device can perform a service level access control with respect to a service request of a remote access client device by extending a device level filter used for a remote access discover agent Config service that is provided by the remote access server device to a service level.

14 Claims, 6 Drawing Sheets

```
<DeviceList controlMode="whiteList">
      <Device udn="31638B2A-AC78-4766-82D5-D53C6480638A"
            friendlyName="David's Media Server" filterMode="EXPORT">
            <CredentialList>
                  <Credential id="David_MP3_Player"/>
            </CredentialList>
      </Device>
      <Device udn="*" filterMode="EXPORT">
            <CredentialList>
                  <Credential id-"Dad_MobilePC"/>
            </CredentialList>
      </Device>
</DeviceList>
```

```
<DeviceList controlMode="whiteList">
        <Device udn="31638B2A-AC78-4766-82D5-D53C6480638A"
                friendlyName="David's Media Server" filterMode="EXPORT">
                <CredentialList>
                        <Credential id="David_MP3_Player"/>
                </CredentialList>
                <acl>
                        <entry>
                                <subject><any/></subject>
                                <access><browse/></access>
                        </entry>
                </acl>
        </Device>
</DeviceList>
```

METHOD AND APPARATUS FOR PROVIDING REMOTE DEVICE WITH SERVICE OF UNIVERSAL PLUG AND PLAY NETWORK

CROSS-REFERENCE TO RELATED PATENT APPLICATION

This application claims priority under 35 U.S.C. §119 from Korean Patent Application No. 10-2007-0052924, filed on May 30, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to a universal plug and play (UPnP) network, and more particularly, to a method and apparatus for providing a remote device with a service of a UPnP network.

2. Description of the Related Art

A UPnP communication protocol for communication among devices in a home network is a standard for analyzing attribute and control information of a device by analyzing a predetermined message with a simple object access protocol (SOAP) type on the basis of an internet protocol (IP) packet.

Recently, there have been many attempts for allowing an external UPnP device to operate as though the external UPnP device is located in the UPnP network. However, in most cases, the external UPnP device is limited in terms of performing processes such as IP addressing, discovery, description, control, and eventing. Therefore, a UPnP remote access architecture is being researched so as to allow the external UPnP device to operate as though the external UPnP device is physically located in the UPnP network, even when the external UPnP device is located far apart from the UPnP network.

Figure 1:
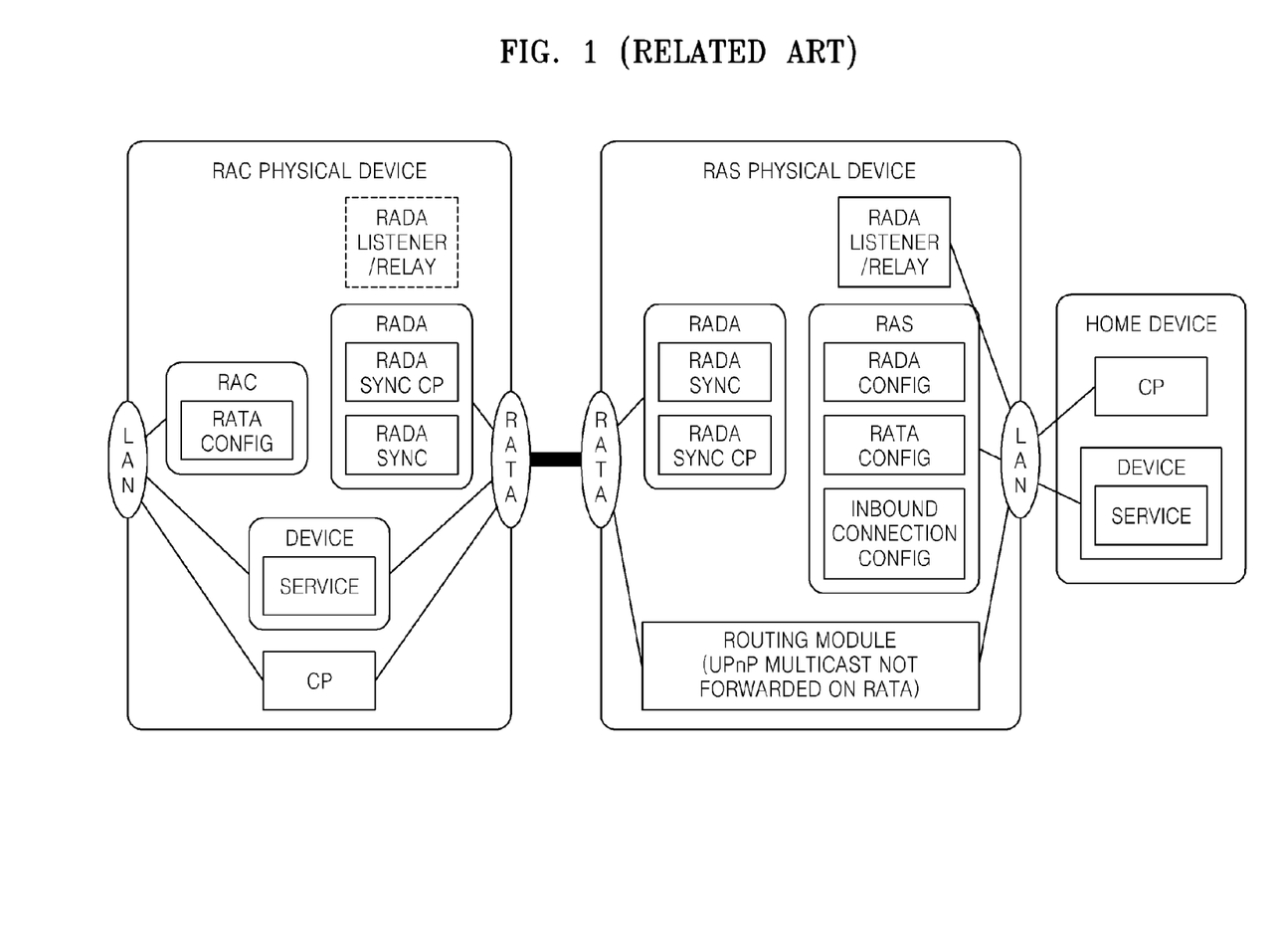
FIG. 1 illustrates an environment of a conventional UPnP remote architecture.

FIG. 1 illustrates an environment of a conventional UPnP remote architecture. Hereinafter, the conventional UPnP remote architecture shown in FIG. 1 will be described, and a more detailed description is disclosed in a related standard.

A remote access server (RAS) device and a home device exist in a UPnP network, and a remote access client (RAC) device is located far apart from the UPnP network. An RAS may be mounted on a home gateway or an independent home network device.

A remote access transport agent (RATA) provides a secured communication channel between the RAC device and the RAS device, and in general, a virtual private network (VPN) is used to embody the secured communication channel.

A management console (not shown) supplies parameters needed for setting a remote access transport channel (RATC) by using a RATA Config that indicates a service provided by the RAS and the RAC devices, and the management console indicates a control point including a user interface.

In general, since an access through the RATA starts by a remote device that is the RAC device, the RAS of a home network has to be recognizable and reachable through the Internet. An InboundConnectionConfig service provides an interface so as to allow a network manager to configure necessary settings so that the RAC device may establish the RATC with the RAS.

A routing module transmits a message between the home device and the RAC device and divides a multicast domain, so that traffic, which is multicast in the UPnP network, is not transmitted to a remote network through the RATC.

By monitoring a simple service discovery protocol (SSDP) message, a remote access discovery agent (RADA) Listener/Relay provides information regarding the joining or leaving of a device, when the device joins or leaves a local network. In addition, the RADA Listener/Relay responds to an SSDP Query (M-Search) of a local device with respect to the remote device.

An RADA is a device for performing a discovery process in the UPnP network, and the RADA synchronizes a network image. Such synchronization of the network image represents that devices and services recognized by the RAS device after performing the discovery process are synchronized with devices and services recognized by the RAC device.

Figure 2:
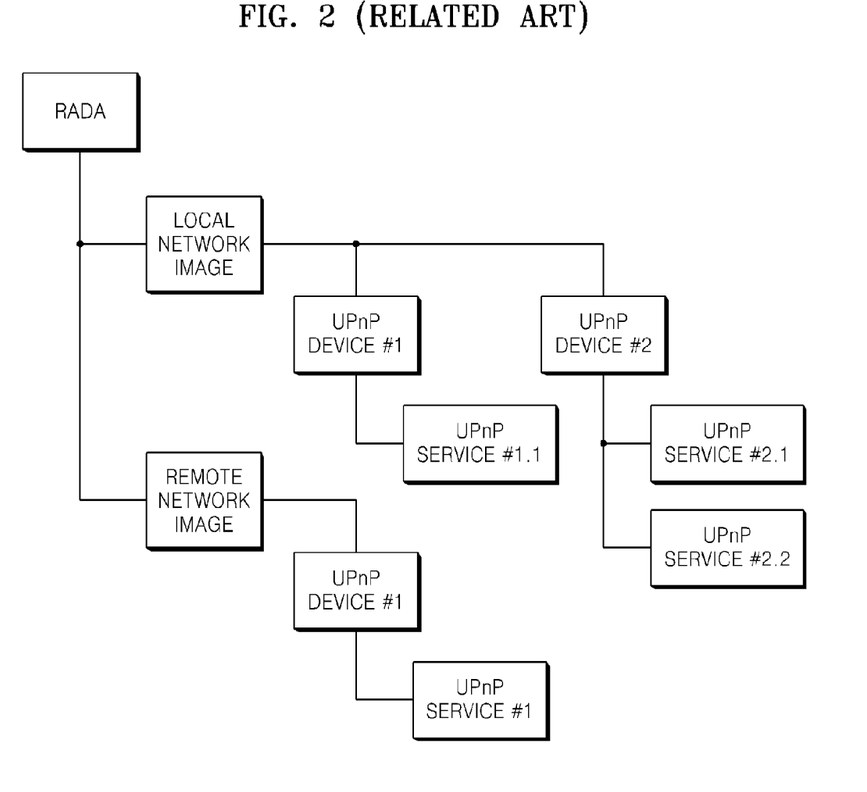
FIG. 2 illustrates a synchronization of a network image.

FIG. 2 illustrates a synchronization of a network image by the RADA. As shown in FIG. 2, UPnP devices and UPnP services, which are located in a local network and a remote network, are recognized as though the UPnP devices and the UPnP services are located in a UPnP network. For this, when a new device or service is added to the local network, an RADA Sync control point (CP) of the RAS device adds the new device or service to a remote network node of the network image by performing an AddRemoteDevice( ) function provided by a RADA Sync service of the RAC device. When another new device or service is added to the remote network, the aforementioned process is also applied.

The RAC device discovers the new service from the synchronized network image and directly requests a corresponding UPnP device to provide the discovered service through the RATC. At this time, the RAS device only functions as a router.

The RADA Config of the RAS device is a service for allowing a user to select a network image that is opened up to the remote network, and the RADA Config service provides an interface for allowing the user to input filtering information.

Figure 3:
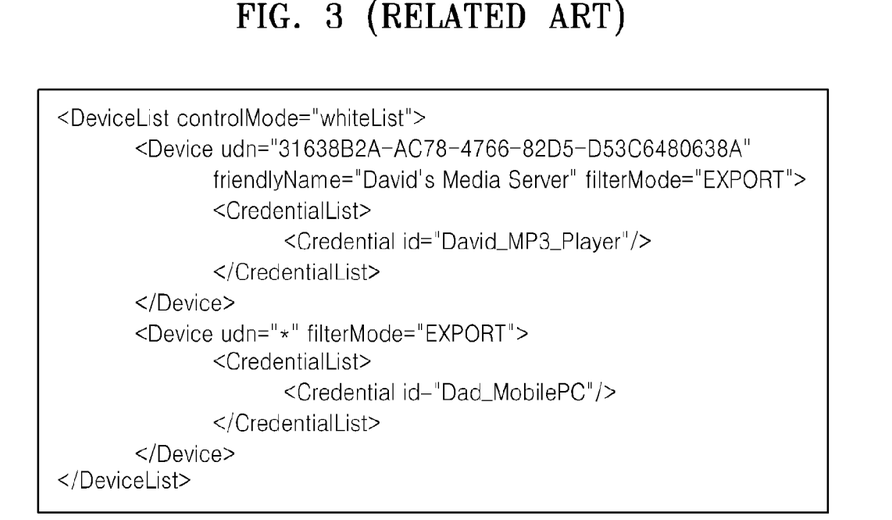
FIG. 3 illustrates filtering information of a conventional RADA Config service.

FIG. 3 illustrates the filtering information of a conventional RADA Config service. The user sets a network image that is externally opened up to the local network by inputting the filtering information as shown in FIG. 3.

Referring to FIG. 3, a device of which a unique device name (UDN) is "31638 . . . " among devices of the local network is only opened up to an RAC device which uses the RATC with a credential ID David_MP3_Player. All the devices of which the UDNs are "*" of the local network are opened up to the RAC device that uses the RATC with a credential ID "Dad_MobilePC".

As described above, the RAC device discovers a service from the synchronized network image. However, the RAC device does not discover a service provided by a device filtered by the RADA Config service of the RAS device. As shown in FIG. 3, this is because the filtering information of the RADA Config service is device level information. Accordingly, in order to effectively and flexibly manage the network, a mechanism for a service level access control is required.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

According to an aspect of the present invention, there is provided a method of communicating between an RAS device and an RAC device in a UPnP network, the method comprising: analyzing an identifier of the RAC device and a type of requested action based on a control message received from the RAC device; comparing the analyzed information with predetermined filtering information; and selectively forwarding the control message to a corresponding device of the UPnP network based on the comparison result.

The method may further comprise receiving the filtering information from a management console of the UPnP network through a message for requesting a predetermined action of an RADA Config service.

The predetermined action may provide an interface for setting an access control filter that is applied to an RADA of the RAS device to the management console.

The method may further comprise determining whether a message that is received from the RAC device is a control message.

The determining may be performed by referring to an HTTP (hypertext transfer protocol) header of the received message.

According to another aspect of the present invention, there is provided a computer-readable recording medium having embodied thereon a computer program for executing the method.

According to another aspect of the present invention, there is provided an RAS device, which communicates with an RAC device, comprising: a control message analyzer which analyzes an identifier of the RAC device and a type of requested action based on a control message that is received from the RAC device; a comparator which compares the analyzed information with predetermined filtering information; and a transmitter which selectively forwards the service control message to a corresponding device of the UPnP network based on the comparison result.

The RAS device may further comprise a receiver which receives the filtering information from a management console of the UPnP network through a message for requesting a predetermined action of an RADA Config service.

The predetermined action may provide an interface for setting an access control filter that is applied to an RADA of the RAS device to the management console.

The RAS device may further comprise a determiner which determines whether a message that is received from the RAC device is a control message.

The determiner may determine the type of message by referring to an HTTP header of the received message.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS

Hereinafter, exemplary embodiments of the present invention will be described in detail with reference to the attached drawings.

Figure 4:
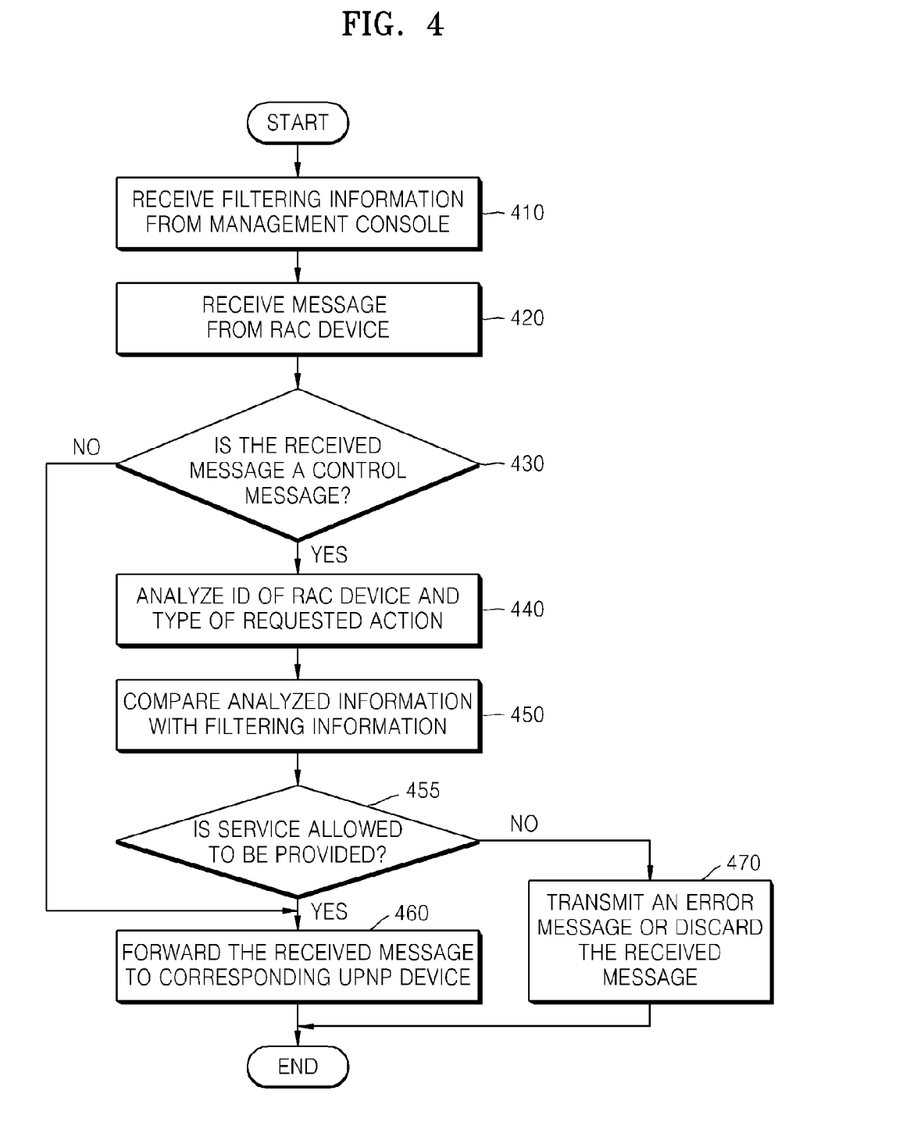
FIG. 4 is a flowchart of a method in which an RAS device processes a message received from an RAC device according to an exemplary embodiment of the present invention.

FIG. 4 is a flowchart of a method in which an RAS device processes a message received from an RAC device according to an exemplary embodiment of the present invention.

As illustrated in FIG. 4, the RAS device receives filtering information from a management console (410), and the filtering information may be input by a user through a user interface of the management console. Specifically, the management console provides the filtering information as an argument through a message for requesting a predetermined action provided by an RADA Config service of the RAS device. At this point, the predetermined action is defined in an RADA Config so as to provide an interface for setting an access control filter applied to an RADA of the RAS device to the management console.

The RAS device receives a message from the RAC device (420) and determines whether a message that is received in operation 430 is a control message (430). At this time, the message indicates a message for requesting an action. The control message in a UPnP device is based on a SOAP type. Since a message with the SOAP type is based on an HTTP extended framework (RFC 2774), it is possible to easily determine whether the received message is the control message by only analyzing an HTTP header of the received message. If it is determined that the received message is not the control message, the received message is forwarded to the corresponding UPnP device (460).

On the other hand, when the received message is the control message, the control message is parsed. Then, an identifier (ID) of the RAC device that transmits the message and a type of requested action are analyzed (440).

The analyzed information including a unique device name (UDN) of the RAC device and the requested action are compared with filtering information of the RADA Config (450). That is, it is determined whether the request for the action of the RAC device is transmitted to a local network based on the filtering information that is previously set by the user.

Based on the analysis result of the filtering information, if it is determined that the corresponding service of the local network is allowed to be provided to the RAC device that transmits the control message (455-Y), the control message that is received by the UPnP device is forwarded (460).

If it is determined that the corresponding service has to be filtered with respect to the RAC device that transmits the control message (455-N), an error message is transmitted to the RAC device, or the received control message is discarded (470).

Figure 5:
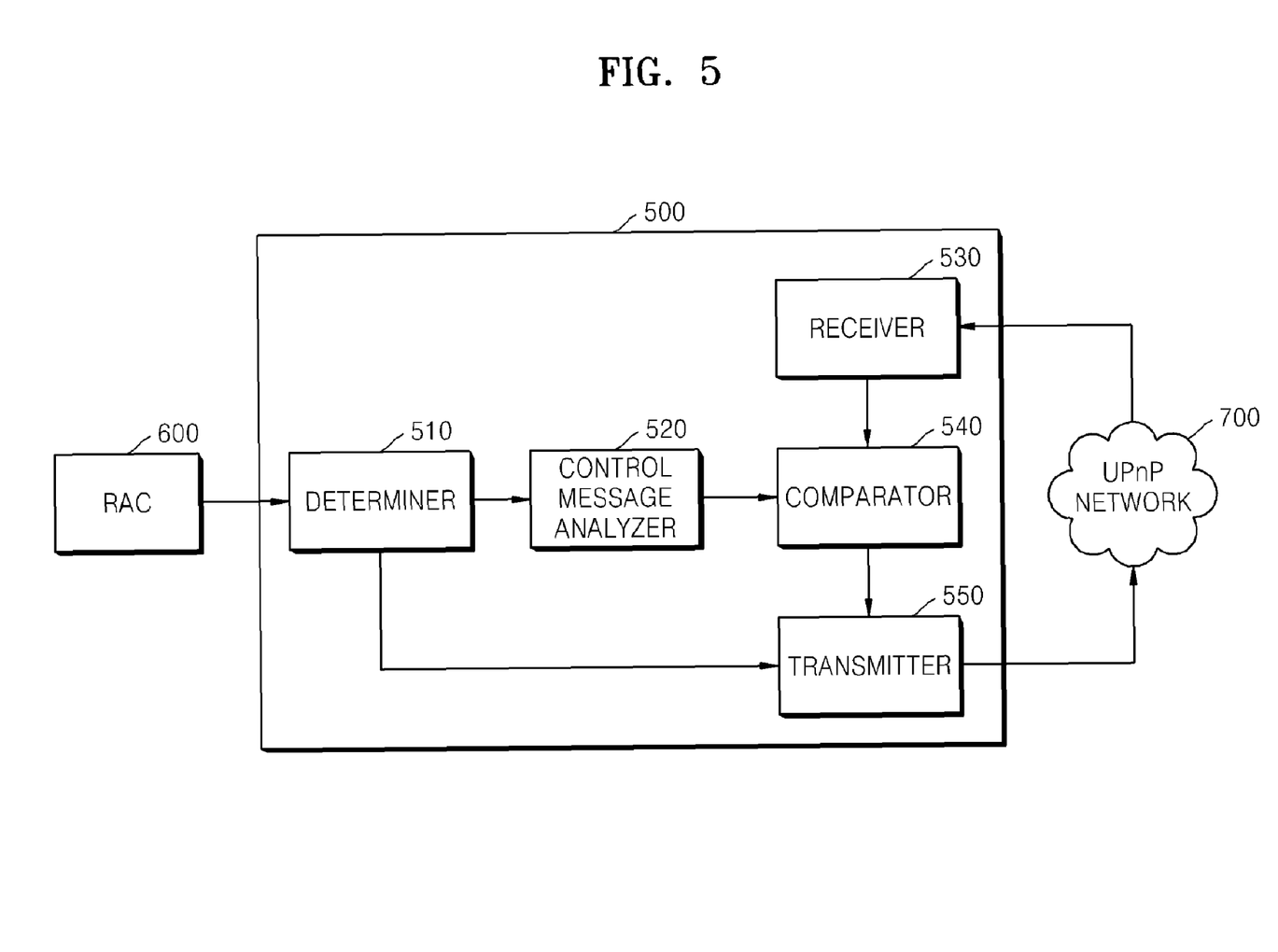
FIG. 5 illustrates a structure of an RAS device according to an exemplary embodiment of the present invention.

FIG. 5 illustrates a structure of an RAS device 500 according to an exemplary embodiment of the present invention.

As shown in FIG. 5, the RAS device 500 according to the exemplary embodiment includes a determiner 510, a control message analyzer 520, a receiver 530, a comparator 540, and a transmitter 550.

The determiner 510 determines whether a message that is received from an RAC device 600 is a control message by analyzing the message received from the RAC device 600. As described above, it is possible to recognize whether the received message is the control message by analyzing an HTTP header of the received message. If the received message is not the control message, the received message is transmitted to the transmitter 550. If the received message is the control message, the received message is transmitted to the control message analyzer 520 that analyzes an ID of the RAC device 600 and a type of requested action by parsing the received control message. The analysis result is then transmitted to the comparator 540.

The receiver 530 receives filtering information from a management console (not shown) of a UPnP network, and the filtering information can be received through a message for requesting a predetermined action of an RADA Config service provided by the RAS device 500. As described above, the predetermined action is defined in the RADA Config so as to provide an interface for setting an access control filter that is applied to the RADA of the RAS device to the management console.

The comparator 540 compares the filtering information with the information transmitted from the control message analyzer 520, which includes a UDN of the RAC device 600 and a type of requested action. Based on the comparison result, if the requested action is allowed, the control message is transmitted to the transmitter 550. If the requested action is not allowed and has to be filtered, the control message is discarded.

The transmitter 550 forwards the message, which is transmitted from the determiner 510 or comparator 540, to a corresponding device of a UPnP network 700.

Figure 6:
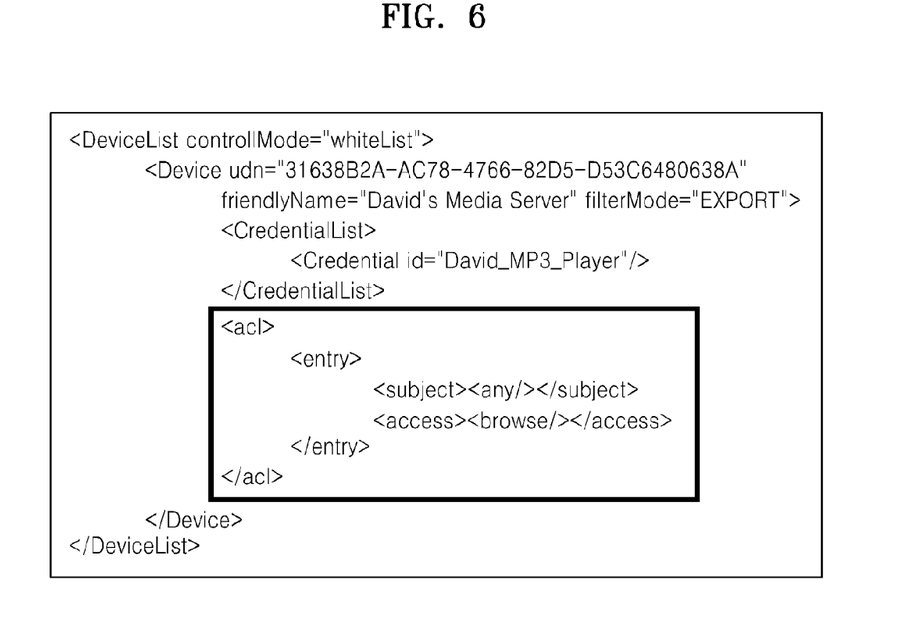
FIG. 6 illustrates filtering information of an RADA Config service according to an exemplary embodiment of the present invention.

FIG. 6 illustrates filtering information of the RADA Config service according to an exemplary embodiment of the present invention.

As shown in FIG. 6, the filtering information according to the exemplary embodiment can be applied by adding a new tag to the filtering information of the RADA Config service. In the exemplary embodiment, the tag is referred to as an access control list (ACL).

Referring to FIG. 6, since a tag value of <subject> is <any/>, and a tag value of <access> is <browse/>, a filter of the RADA Config is set so as to provide a browse( ) action for all the RAC devices based on the filtering information according to the exemplary embodiment. Accordingly, when a remote UPnP device transmits a browse( ) request message, the RAS device according to the exemplary embodiment receives the browse( ) request and forwards the browse( ) request to the corresponding UPnP of the local network. When the received message requests an action other than the browse( ) action, the received message is not transmitted, but rather is discarded.

According to an exemplary embodiment of the present invention, the RAS device can perform a service level access control. It is advantageous that the RAS device needs not provide a separate service for the service level access control by extending filtering information used in the existing RADA Config service so as to allow the filtering information to include the service level filtering information.

The exemplary embodiments of the present invention can be written as computer programs embodied on a computer readable recording medium and can be implemented in general-use digital computers that execute the programs using the computer readable recording medium.

Examples of the computer readable recording medium include, but are not limited to, magnetic storage media (e.g., ROM, floppy disks, hard disks, etc.), and optical recording media (e.g., CD-ROMs, or DVDs).

While the present invention has been particularly shown and described with reference to exemplary embodiments thereof, it will be understood by one skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention however by the appended claims, and all differences within the scope will be construed as being included in the present invention.

What is claimed is:

1. A method of communicating between a remote access server device and a remote access client device in a universal plug and play network, the method comprising:
   analyzing an identifier of the remote access client device and a type of requested action based on a control message received from the remote access client device;
   comparing the analyzed information with predetermined filtering information;
   selectively forwarding the control message to a corresponding device of the universal plug and play network based on the comparison result; and
   receiving the filtering information from a management console of the universal plug and play network through a message for requesting a predetermined action of a remote access discovery agent Config service,
   wherein the predetermined action provides an interface for setting an access control filter that is applied to a remote access discovery agent of the remote access server device to the management console.

2. The method of claim 1, further comprising determining whether a message that is received from the remote access client device is a control message.

3. The method of claim 2, wherein the determining is performed by referring to an hypertext transfer protocol header of the received message.

4. A non-transitory computer-readable recording medium having embodied thereon a computer program for executing the method of claim 1.

5. The method according to claim 1, wherein the filtering information is input by a user through a user interface of the management console.

6. The method according to claim 1, wherein the filtering information is set by a user.

7. The method according to claim 1, wherein the control message is selectively forwarded to the corresponding device if the type of requested action is allowed.

8. The method according to claim 1, wherein the predetermined filtering information includes service level filtering information.

9. A remote access server device, which communicates with a remote access client device, comprising:
   a control message analyzer which analyzes an identifier of the remote access client device and a type of requested action based on a control message that is received from the remote access client device;
   a comparator which compares the analyzed information with predetermined filtering information;
   a transmitter which selectively forwards the service control message to a corresponding device of the universal plug and play network based on the comparison result; and
   a receiver receiving the filtering information from a management console of the universal plug and play network through a message for requesting a predetermined action of a remote access discovery agent Config service,
   wherein the predetermined action provides an interface for setting an access control filter that is applied to a remote access discovery agent of the remote access server device to the management console.

10. The remote access server device of claim 9, further comprising a determiner which determines whether a message that is received from the remote access client device is a control message.

11. The remote access server device of claim 10, wherein the determiner determines the type of message by referring to a hypertext transfer protocol header of the received message.

12. A non-transitory computer-readable recording medium having embodied therein a computer program for causing a computer to execute a method of communicating between a remote access server device and a remote access client device in a universal plug and play network, the program including computer executable instructions for performing steps comprising:

analyzing an identifier of the remote access client device and a type of requested action based on a control message received from the remote access client device;

receiving predetermined filtering information from a management console of the universal plug and play network through a message for requesting a predetermined action of a remote access discovery agent Config service;

comparing the analyzed information with the predetermined filtering information; and     selectively forwarding the control message to a corresponding device of the universal plug and play network based on the comparison result; and     providing, via the predetermined action, an interface for setting an access control filter that is applied to a remote access discovery agent of the remote access server device to the management console.

13. The computer readable medium having stored therein a program as defined in claim 12, the program further comprising determining whether a message that is received from the remote access client device is a control message.

14. The computer readable medium having stored therein a program as defined in claim 13, the program further comprising performing the determining by referring to an hypertext transfer protocol header of the received message.

\* \* \* \* \*